(12) United States Patent
Heitz et al.

(10) Patent No.: US 9,453,927 B2
(45) Date of Patent: Sep. 27, 2016

(54) SENSOR STRUCTURE AND YAW RATE SENSOR

(71) Applicant: Robert Bosch GmbH, Stuttgart (DE)

(72) Inventors: Markus Heitz, Kusterdingen (DE); Christoph Gauger, Geislingen Bei Balingen (DE); Sebastian Gracki, Freiburg (DE); Patrick Wellner, Walddorfhaeslach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 650 days.

(21) Appl. No.: 13/729,709

(22) Filed: Dec. 28, 2012

(65) Prior Publication Data

US 2013/0176825 A1   Jul. 11, 2013

(30) Foreign Application Priority Data

Jan. 5, 2012   (DE) .................. 10 2012 200 125

(51) Int. Cl.
*G01V 1/18*   (2006.01)
*G01C 19/5747*   (2012.01)

(52) U.S. Cl.
CPC ............. *G01V 1/18* (2013.01); *G01C 19/5747* (2013.01)

(58) Field of Classification Search
CPC .................... G01C 19/5747; G01C 19/56
USPC ..................... 73/504.12; 367/179
See application file for complete search history.

(56) References Cited

U.S. PATENT DOCUMENTS

2010/0037690 A1\* 2/2010 Gunthner ........... G01C 19/5712
                                                      73/504.04
2011/0132087 A1\* 6/2011 Ohms et al. ............... 73/504.12

FOREIGN PATENT DOCUMENTS

DE   10 2009 046 506   5/2011

\* cited by examiner

*Primary Examiner* — Luke Ratcliffe
(74) *Attorney, Agent, or Firm* — Norton Rose Fulbright US LLP

(57) ABSTRACT

A sensor structure includes a substrate having a main extension plane, a first seismic mass and a second seismic mass, the first and the second seismic masses being deflectable relative to the substrate along a direction of deflection essentially perpendicular to the main extension plane. The first and second seismic masses are coupled together via a rigid coupling rocker pivotable around a rocker axis parallel to the main extension plane. The first seismic mass is suspended from the substrate with the aid of a first suspension spring, and an essentially rigid first coupling bar is situated between the first suspension spring and the first seismic mass.

10 Claims, 5 Drawing Sheets

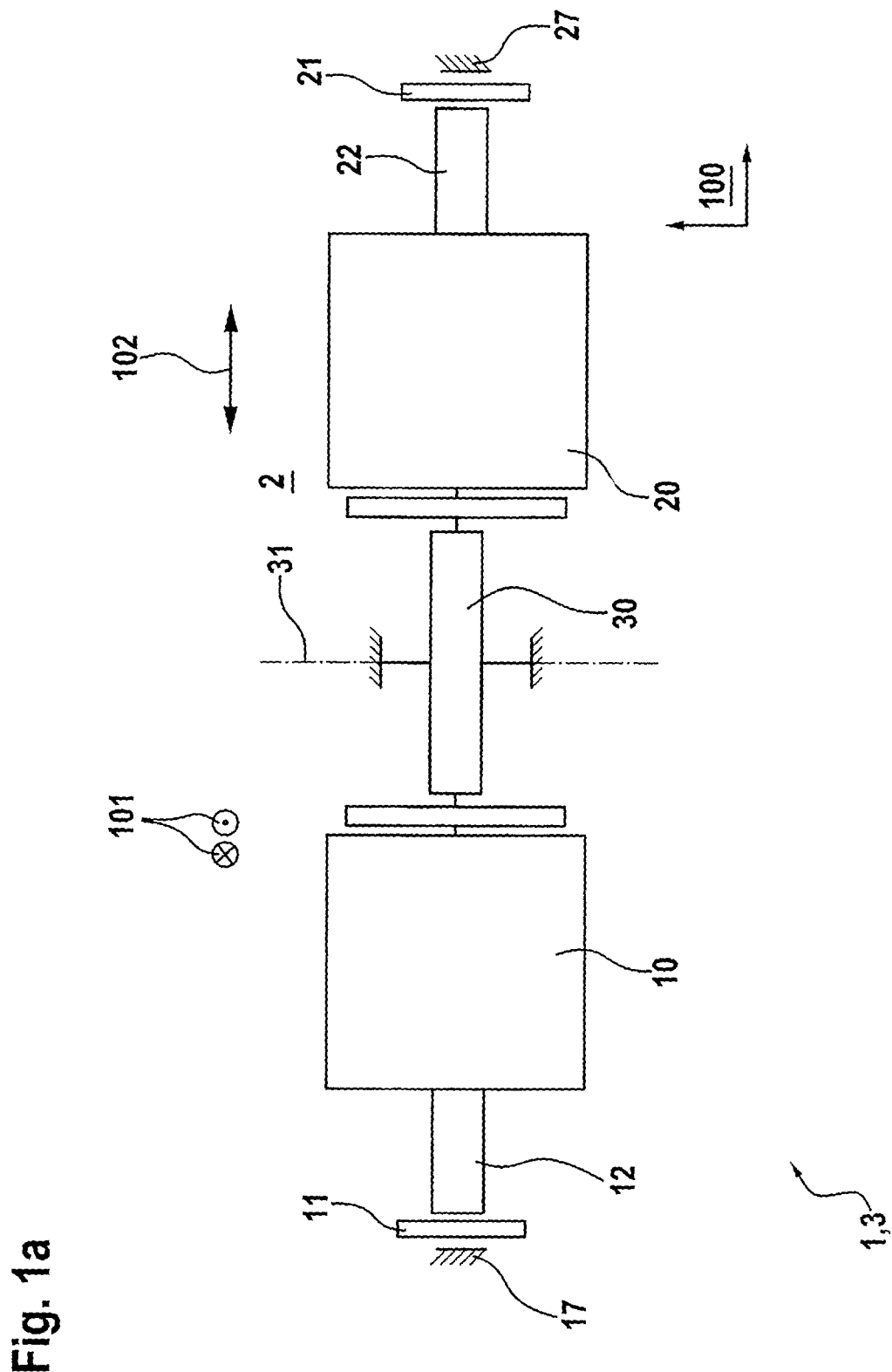

SENSOR STRUCTURE AND YAW RATE SENSOR

BACKGROUND OF THE INVENTION

1. Field of the Invention

The present invention relates to a sensor structure, e.g., for a yaw rate sensor.

2. Description of the Related Art

Such sensor structures are generally known. For example, published German patent application document DE 10 2009 046 506 A1 discloses a yaw rate sensor with Coriolis elements for measuring a yaw rate extending parallel to a main extension plane of the sensor substrate. The sensor includes a first and a second Coriolis element, which are connected to each other via a rigid bar acting as a rocker and two springs and are excited into opposite-phase oscillations parallel and antiparallel to an oscillation axis extending parallel to the main extension plane. The Coriolis elements are also attached to the substrate through additional spring elements. In the presence of a yaw rate parallel to the main extension plane and perpendicular to the oscillation axis, Coriolis forces running perpendicularly to the main extension plane act on the first and the second Coriolis element, and deflect the first and the second Coriolis element perpendicular to the main extension plane.

The yaw rate sensor also has detection means in the form of surface electrodes between the substrate and the Coriolis elements. The surface electrodes overlap the Coriolis elements perpendicular to the main extension plane, forming with the Coriolis elements a plate-type capacitor structure, which permits capacitive measurement of the change in clearance between the Coriolis elements and the surface electrodes. The deflection of the two Coriolis elements is determined from the measurement of the change in clearance and from this the yaw rate is calculated by differentiation. In this process, using two separate seismic masses makes it possible to distinguish between the present yaw rate and the present acceleration, a shared oscillation frequency for the two seismic masses being achieved due to the coupling via the rocker, only one drive and detection circuit being needed. This is particularly important since such sensor structures are typically resonantly operated at the respective frequencies.

In addition to the desirable usable modes "drive mode" and "detection mode" there are respective undesirable parallel modes, the frequency range in the related art being only a little different from the desirable antiparallel usable modes. In particular, in the event of external excitation due to the resonance exaggeration, the parallel detection mode may result in large deflections and thus in an error signal. That is generally undesirable because of the sensitivity to interfering frequencies. Therefore, specific embodiments for the application are of interest, particularly in the automobile sector, in which the frequency range of the parallel mode is above the antiparallel usable mode as far as possible.

BRIEF SUMMARY OF THE INVENTION

The sensor structure according to the present invention and the yaw rate sensor according to the present invention have the advantage over the related art in that the frequency spacing between the desirable antiparallel detection modes and the undesirable parallel detection modes is widened. This has the advantage that the sensor structure is thereby made more stable with respect to external interfering vibrations. That advantage is achieved in that at least the first seismic mass is connected to the substrate via the essentially rigid coupling bar. The coupling bar then functions as a type of guide rail, suppressing a large deflection of the outer part, in other words the part facing away from the coupling rocker. A parasitic parallel oscillation would result in bending of the coupling bar, with the result that the deflection of the parallel detection mode is significantly suppressed with a shift to higher frequencies. In particular, the parasitic parallel detection mode is shifted to higher frequencies than the desirable antiparallel detection mode. The sensitivity to vibration is thus considerably increased by comparison with the related art. The at least one first suspension spring is connected, in particular, directly or indirectly to the substrate.

It is preferable for the sensor structure to have a first and a second detection means, in which case it is particularly preferable for the first detection means to include a first surface electrode overlapping the first seismic mass in the direction of deflection and for the second detection means to include a second surface electrode overlapping the second seismic mass in the direction of deflection. The first surface electrode is fixed in particular to the substrate, and situated between the substrate and the first seismic mass, forming with the first seismic mass a plate-type capacitor, used for capacitive measurement of the deflection of the first seismic mass. In a similar manner, the second surface electrode is fixed in particular to the substrate and situated between the substrate and the second seismic mass, forming with the second seismic mass a plate-type capacitor, used for capacitive measurement of the deflection of the second seismic mass.

The micromechanical structure according to the present invention includes in particular a MEMS (microelectromechanical system) component which is made in a semiconductor production process. The substrate preferably includes a semiconductor material, in particular silicon, which is suitably structured to form the first and the second movable mass, the coupling rocker and the at least one coupling element. Here, the structure is preferably created within the scope of a lithography, etching, deposit and/or bonding process.

According to one preferred specific embodiment it is provided that the second seismic mass is suspended from the substrate with the aid of a second suspension spring, the sensor structure including an essentially rigid second coupling bar which is situated between the second suspension spring and the second seismic mass, the second coupling bar in a rest position of the first and the second seismic mass being oriented essentially parallel to the first coupling bar. Thereby an advantageous effective suppression of the parallel detection modes and in particular a shift of the parallel detection modes to higher frequencies is achieved, since in the parallel detection modes both the first coupling bar and the second coupling bar have to bend. The first and the second coupling bars are, however, designed to be essentially rigid against bending, so that suppression of these oscillation modes is achieved.

According to one preferred specific embodiment it is provided that a first end section of the first coupling bar is attached to the first seismic mass and a second end section of the first coupling bar is attached to the first suspension spring, the coupling bar extending in a rest position of the seismic mass essentially parallel to the main extension plane and perpendicular to the rocker axis. It is advantageous for the first seismic mass also to be suspended from the substrate with the aid of the first coupling bar. The first suspension spring is attached in particular to a substrate anchor fixed to the substrate. In the sense of the present invention, the term "rest position" means in particular that position of the sensor structure in which the first and the second seismic masses are at the same distance from the substrate (in other words there is no deflection around the rocker axis).

According to one preferred specific embodiment it is provided that the first coupling bar is bendable in the first end section with respect to the first seismic mass around a bending axis parallel to the rocker axis. It is advantageous if a slight bending or tilting of the first coupling bar with respect to the first seismic mass is possible in the transition area between the first coupling bar and the seismic mass, so that the freedom of movement of the seismic mass along the direction of deflection is not excessively restricted. It is advantageous for the first coupling bar, parallel to the rocker axis, to be made significantly narrower than the first seismic mass.

According to one preferred specific embodiment it is provided that a further first end section of the second coupling bar is attached to the second seismic mass and a further second end section of the second coupling bar is attached to the second suspension spring. It is further advantageous for the second coupling bar to be bendable in the further first end section with respect to the second seismic mass around a further bending axis parallel to the rocker axis. The second coupling bar is thus preferably designed to be symmetrical to the first coupling bar, so that the symmetry of the sensor structure with respect to a plane of symmetry perpendicular to the main extension plane and running through the rocker axis is not disturbed.

According to one preferred specific embodiment it is provided that the coupling rocker is connected to the substrate with the aid of at least one torsion spring extending parallel to the rocker axis and/or a clearance between the second end section and the substrate along the direction of deflection being essentially identical to a clearance between the further second end section and the substrate. It is conceivable for a clearance between the torsion spring and the substrate to be also essentially identical to the clearance between the second end section and the substrate. The freedom of movement of the first and the second seismic mass is advantageously restricted to an antiparallel movement of the rocker around the rocker axis, since in the event of a parallel movement of the first and the second seismic masses along the direction of deflection the first coupling bar, the second coupling bar and/or the coupling rocker would have to be bent due to the limited installation space available between the suspension springs.

According to one preferred specific embodiment it is provided that the first seismic mass includes a first Coriolis element, which is drivable with the aid of first drive means to a first drive oscillation parallel to the main extension plane and perpendicular to the rocker axis, and the second seismic mass including a second Coriolis element, which is drivable with the aid of second drive means to a second drive oscillation antiparallel to the first drive oscillation. Thus operation of the sensor structure as a Coriolis sensor is advantageously possible.

According to one preferred specific embodiment it is provided that the first drive means includes a first drive frame at least partially enclosing the first Coriolis element parallel to the main extension plane, the first drive frame having a first orifice through which the first coupling bar passes and a second orifice through which the coupling rocker passes, and/or the second drive means including a second drive frame at least partially enclosing the second Coriolis element parallel to the main extension plane, and the second drive frame having a further first orifice through which the second coupling bar passes and a further second orifice through which the coupling rocker passes. A comparatively compact configuration of the sensor structure is thus advantageously possible.

Another object of the present invention is a yaw rate sensor which has a sensor structure according to the present invention. A yaw rate sensor for measuring yaw rates around a rotation axis parallel to the rocker axis is advantageously implemented, which in comparison with the related art demonstrates a reduced sensitivity to vibration.

BRIEF DESCRIPTION OF THE DRAWINGS

FIGS. 1a and 1b show a schematic top view and a cross-sectional view of a sensor structure according to a first specific embodiment of the present invention.

DETAILED DESCRIPTION OF THE INVENTION

Figure 1B:
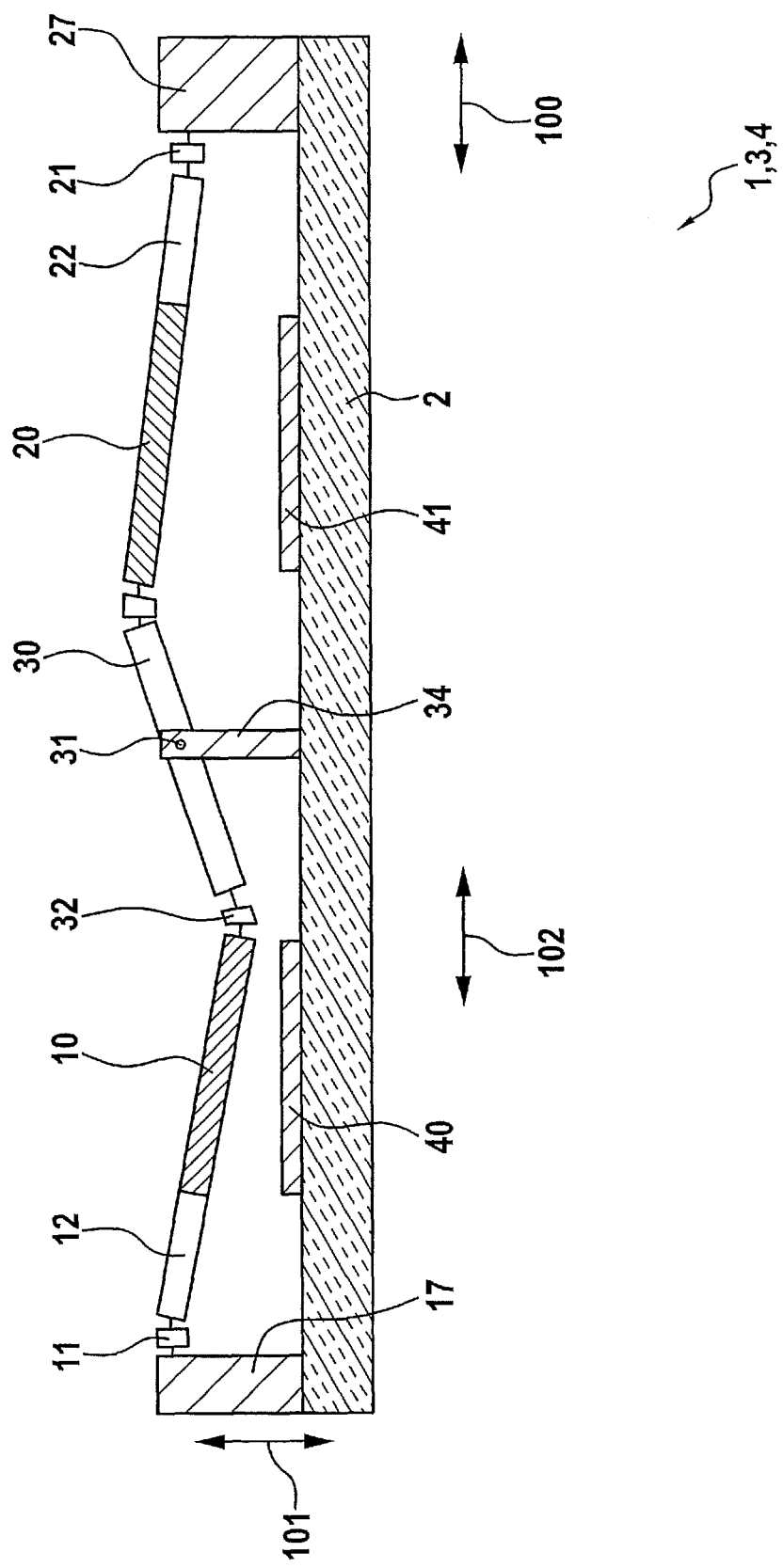

In the various figures identical parts always bear identical reference numerals and in consequence are generally named or mentioned only once.

FIGS. 1a and 1b show a schematic top view and a cross-sectional view of a sensor structure 1 according to a first specific embodiment of the present invention. Sensor structure 1 has a substrate 2 with a main extension plane 100, a first seismic mass 10 movable relative to substrate 2 and a second seismic mass 20 movable relative to substrate 2. The first and the second seismic mass 10, 20 are each coupled via connecting springs 32 with a shared and essentially rigid coupling rocker 30. Coupling rocker 30 is attached with the aid of torsion springs 33 to a substrate anchor 34 fixed to the substrate, in such a way that a rocking movement of coupling rocker 30 around a rocker axis 31 parallel to main extension plane 100 is enabled. On a side facing away from torsion rocker 33 along a direction parallel to main extension plane 100, first seismic mass 10 is connected to a first end section of an essentially rigid first coupling bar 12. A second end section of first coupling bar 12 is connected to a first suspension spring 11, which engages with a further substrate anchor 17 fixed to the substrate.

In a similar manner, sensor structure 1 has a second coupling bar 22, which with a first end section is attached to a side of second seismic mass 20 facing away from torsion rocker 33 along a direction parallel to main extension plane 100 and which with a second end section is attached to a second suspension spring 21. Second suspension spring 21 is attached to a further substrate anchor 27 fixed to the substrate. In FIG. 1a it is apparent that the extension of first coupling bar 12, of second coupling bar 22 and of coupling rocker 30 is less, parallel to rocker axis 31, than the extension of first seismic mass 10 and second seismic mass 20. FIG. 1b shows that first and second seismic mass 10, 20 move antiparallel along direction of deflection 101 in the event of a rocking movement of coupling rocker 30 around rocker axis 31. It is preferable for first and second seismic mass 10, 20 to be driven with the aid of drive means, not shown, to antiparallel drive oscillations along a drive direction 102 parallel to main extension plane 100 and perpendicular to rocker axis 31.

If now a yaw rate parallel to rocker axis 31 is applied to sensor structure 1, antiparallel Coriolis forces act on first and second seismic mass 10, 20 along direction of deflection 101. First and second seismic mass 10, 20 thus cause the rocking movement around rocker axis 31 and are deflected along direction of deflection 101. These deflections are measured with the aid of a first and a second detection means 40, 41, first detection means 40 including a first surface electrode overlapping first seismic mass 10 in direction of deflection 101 and second detection means 41 including a second surface electrode overlapping second seismic mass 20 in direction of deflection 101. In this case, the first surface electrode is situated, fixed to the substrate, between substrate 2 and first seismic mass 10, forming with first seismic mass 10 a plate-type capacitor for capacitive measurement of the deflection of first seismic mass 10. In a similar manner, the second surface electrode is situated, fixed to the substrate, between substrate 2 and second seismic mass 20, forming with second seismic mass 20 a plate-type capacitor for capacitive measurement of the deflection of second seismic mass 20. A differential assessment of the signals then gives the size of the deflection of first and second seismic mass 10, 20 and thus of the applied yaw rate. By guiding first and second seismic mass 10, 20 due to first and second coupling bar 12, 22, a common and parallel movement of seismic masses 10, 20 towards substrate 2 or away from substrate 2 is suppressed, since first and second coupling bar 12, 22 would have to bend to allow such movement. In other words, the parasitic parallel oscillation of first and second seismic mass 10, 20 is shifted to higher frequencies and thus moves away from the antiparallel detection oscillation.

Figure 2A:
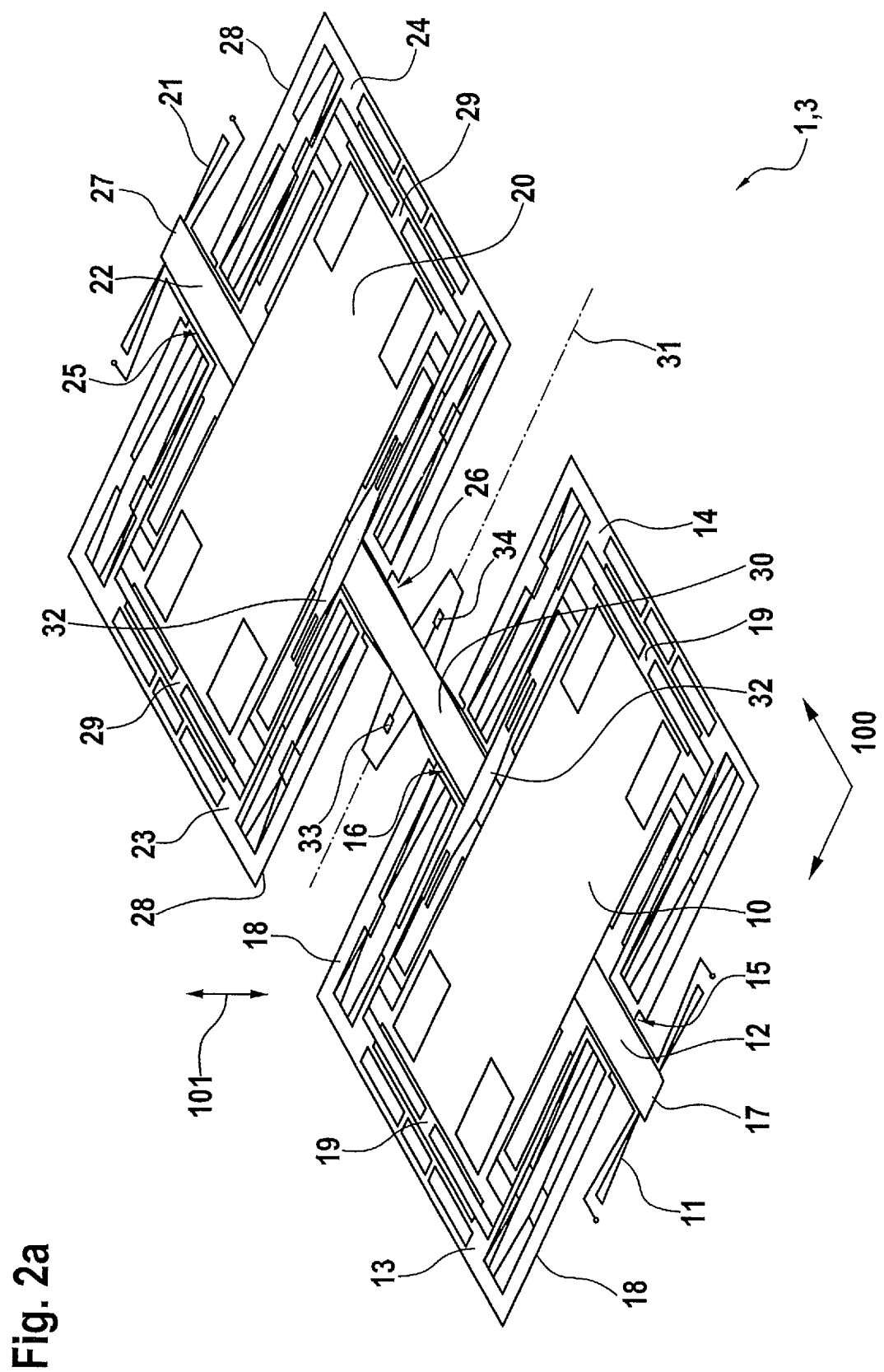
FIGS. 2a, 2b and 2c show perspective views of a sensor structure according to a second specific embodiment of the present invention.
Figure 2B:
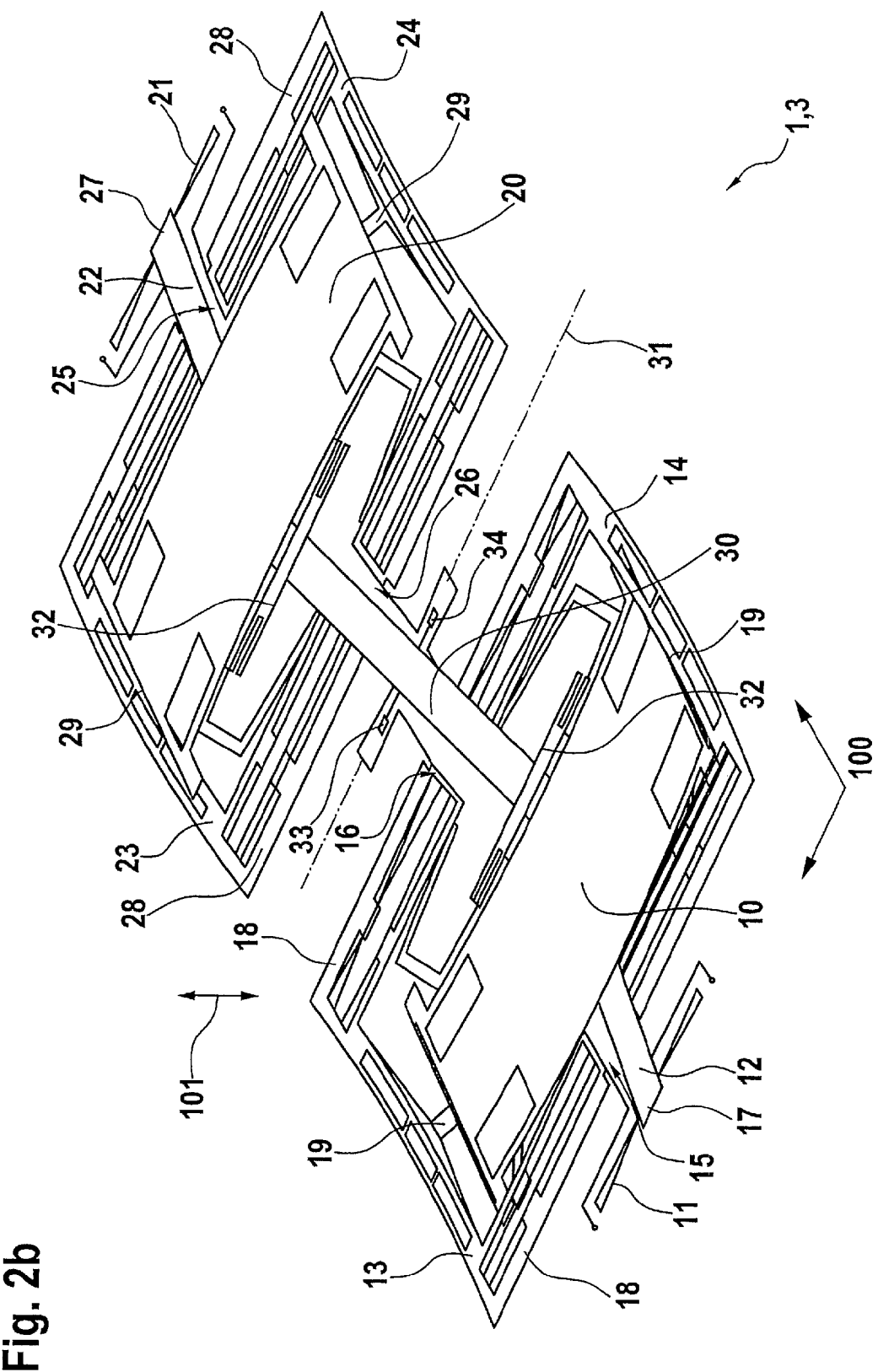
Figure 2C:
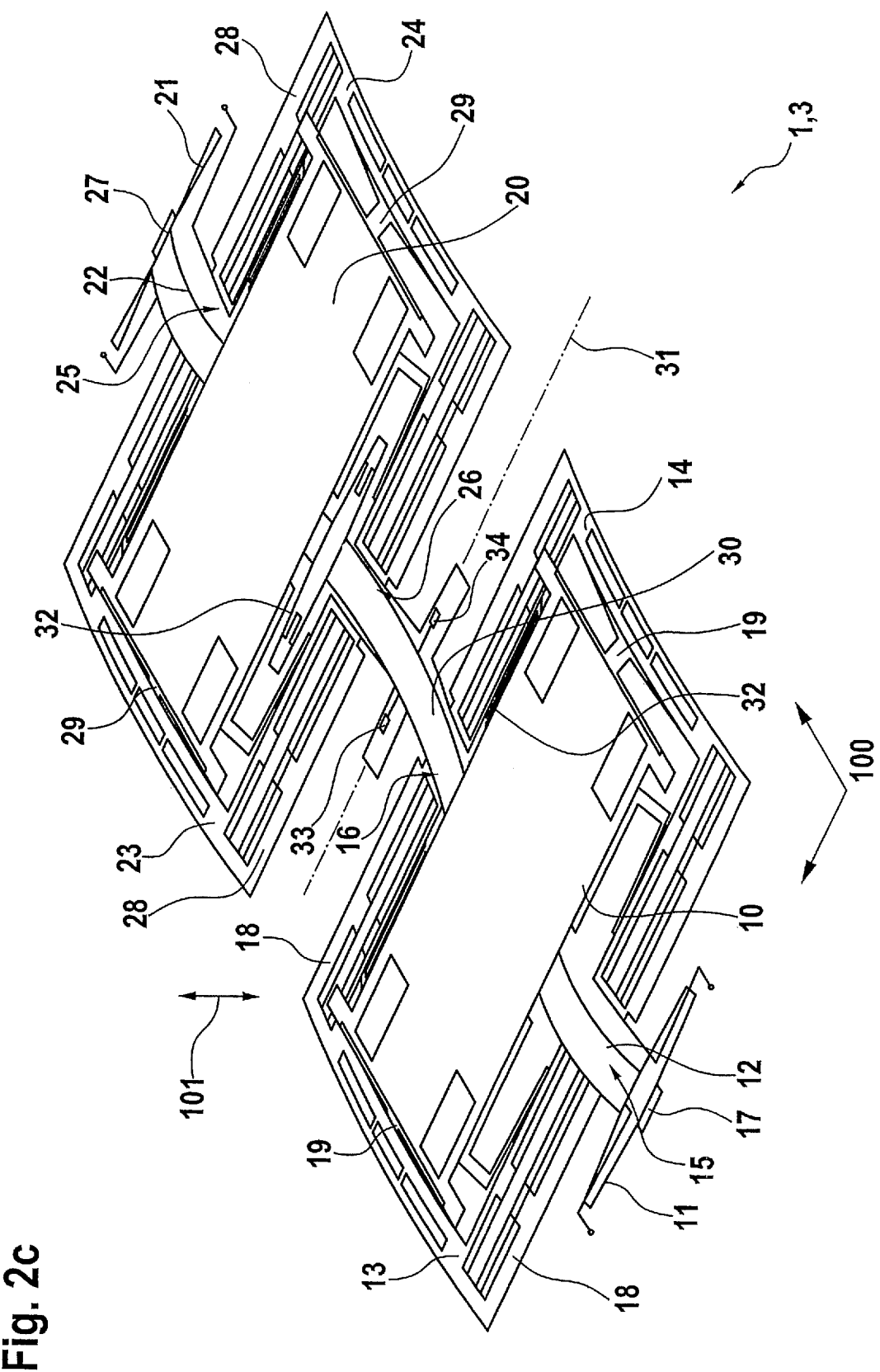

FIGS. 2a, 2b and 2c show perspective views of a sensor structure 1 according to a second specific embodiment of the present invention, the second specific embodiment being essentially the same as the first specific embodiment illustrated in FIGS. 1a and 1b, the first specific embodiment having, by contrast, a first and a second drive frame 14, 24 to drive the drive oscillations along drive direction 102. First drive frame 14 is put into an oscillation parallel to drive direction 102 with the aid of first comb electrode drives 18 and transmits this oscillation with the aid of springs 19 to first seismic mass 10. In this case, first drive frame 14 partially frames only first seismic mass 10, since first drive frame 14 has a first orifice 15 through which first coupling bar 12 passes and a second orifice 16 through which coupling rocker 30 passes. In a similar manner second drive frame 24 is put into an oscillation antiparallel to the oscillation of first drive frame 14 with the aid of second comb electrode drives 28. Second drive frame 24 transmits this antiparallel oscillation through further springs 29 to second seismic mass 20. In this case, second drive frame 24 also only partially frames second seismic mass 20, since second drive frame 24 has a further first orifice 25 through which second coupling bar 22 passes and a further second orifice 26 through which coupling rocker 30 passes.

FIG. 2b shows an antiparallel detection oscillation, the so-called usable mode, when a yaw rate is present. It is apparent that the antiparallel deflection of first and second seismic mass 10, 20 is not hindered by first and second coupling bar 12, 22. FIG. 2c, on the other hand, shows the undesirable parallel detection movement, the so-called parasitic parallel mode, of first and second seismic mass 10, 20 along direction of deflection 101. In FIG. 2c it is apparent that a bending of coupling rocker 30, of first coupling bar 12 and/or of second coupling bar 22 is necessary in order to achieve such a parasitic parallel oscillation. The parallel detection movement is thus heavily suppressed and shifted to high frequencies. By the use of separate first and second drive frames 14, 24 a partial decoupling of the drive and the detection movement is also achievable, so that a bridging from the drive movement to the detection movement is reduced.

What is claimed is:

1. A sensor structure, comprising:
    a substrate having a main extension plane;
    a first seismic mass and a second seismic mass, wherein the first seismic mass and the second seismic mass are deflectable relative to the substrate along a direction of deflection essentially perpendicular to the main extension plane of the substrate;
    a rigid coupling rocker which couples together the first seismic mass and the second seismic mass, wherein the rigid coupling rocker is pivotable around a rocker axis parallel to the main extension plane of the substrate;
    a first suspension spring, wherein the first seismic mass is suspended from the substrate with the aid of the first suspension spring; and
    an essentially rigid first coupling bar connected to the first suspension spring and the first seismic mass, wherein a first end section of the first coupling bar is attached directly to the first seismic mass.

2. The sensor structure as recited in claim 1, further comprising:
    a second suspension spring, wherein the second seismic mass is suspended from the substrate with the aid of the second suspension spring; and
    an essentially rigid second coupling bar situated between the second suspension spring and the second seismic mass, wherein the second coupling bar is oriented essentially parallel to the first coupling bar in a rest position of the first seismic mass and the second seismic mass.

3. The sensor structure as recited in claim 1, wherein:
    a second end section of the first coupling bar is attached to the first suspension spring; and
    the first coupling bar extends in a rest position of the first seismic mass essentially parallel to the main extension plane and perpendicular to the rocker axis.

4. The sensor structure as recited in claim 3, wherein the first coupling bar is bendable with respect to the first seismic mass in the first end section around a first bending axis parallel to the rocker axis.

5. The sensor structure as recited in claim 3, wherein:
    a first end section of the second coupling bar is attached to the second seismic mass; and
    a second end section of the second coupling bar is attached to the second suspension spring.

6. The sensor structure as recited in claim 5, wherein the second coupling bar is bendable with respect to the second seismic mass in the first end section of the second coupling bar around a second bending axis parallel to the rocker axis.

7. The sensor structure as recited in claim 1, wherein at least one of:
    (i) the coupling rocker is connected to the substrate with the aid of at least one torsion spring extending parallel to the rocker axis; and
    (ii) a clearance between the second end section of the first coupling bar and the substrate along the direction of deflection is essentially identical to a clearance between the second end section of the second coupling bar and the substrate.

8. The sensor structure as recited in claim 1, wherein:
    the first seismic mass includes a first Coriolis element which is drivable with the aid of a first drive unit into a first drive oscillation parallel to the main extension plane of the substrate and perpendicular to the rocker axis; and the second seismic mass includes a second Coriolis element which is drivable with the aid of a second drive unit into a second drive oscillation antiparallel to the first drive oscillation.

9. The sensor structure as recited in claim 8, wherein at least one of:

(i) the first drive unit includes a first drive frame at least partially framing the first Coriolis element parallel to the main extension plane, the first drive frame having a first orifice through which the first coupling bar passes and a second orifice through which the coupling rocker passes; and (ii) the second drive unit includes a second drive frame which at least partially encloses the second Coriolis element parallel to the main extension plane, the second drive frame having a further first orifice through which the second coupling bar passes and a further second orifice through which the coupling rocker passes.

10. The sensor structure as recited in claim 9, wherein the sensor structure is part of a yaw rate sensor.

* * * * *